United States Patent [19]

Matsubara et al.

[11] 3,887,659
[45] June 3, 1975

[54] PROCESS FOR PRODUCING DIALKYL PHOSPHOROCHLORIDOTHIOATE

[75] Inventors: Hiroyuki Matsubara; Kennosuke Imamura; Yuhei Sogabe; Toshio Aso, all of Tokyo, Japan

[73] Assignee: Nippon Chemical Industrial Co., Ltd., Tokyo, Japan

[22] Filed: Oct. 31, 1973

[21] Appl. No.: 411,571

[52] U.S. Cl. .............................. 260/986; 260/960
[51] Int. Cl. ............................................. C07f 9/20
[58] Field of Search .................................... 260/986

[56] References Cited
UNITED STATES PATENTS
3,089,890  5/1963  Chupp et al. ................ 260/986 X
3,502,750  3/1970  Anglaret et al. ................ 260/986

OTHER PUBLICATIONS

Strokov, "Chem. Abs.," Vol. 24, (1930), p. 470.

*Primary Examiner*—Anton H. Sutto
*Attorney, Agent, or Firm*—Sughrue, Rothwell, Mion, Zinn and Macpeak

[57] ABSTRACT

A process for producing dialkyl phosphorochloridothioate, which comprises chlorinating a dialkyl dithiophosphoric acid, and continuously mixing at a pH of 6 to 9 the reaction product obtained with a metal sulfide solution.

6 Claims, No Drawings

PROCESS FOR PRODUCING DIALKYL PHOSPHOROCHLORIDOTHIOATE

BACKGROUND OF THE INVENTION

1. Field of the Invention

The present invention relates to a process for producing dialkyl phosphorochloridothioates represented by the following general formula;

(1)

wherein R represents an alkyl group having 1 to 3 carbon atoms.

2. Description of the Prior Art

Dialkyl phosphorochloridothioates (hereinafter referred to as "acid chlorides") are widely produced on a large scale as the starting material for the production of organic phosphorus insecticides.

Two methods are known for the production of these acid chlorides: method (a) in which phosphorus thiochloride and alcohols are used as the starting materials; and method (b) in which dialkyl dithiophosphoric acids synthesized from phosphorus pentasulfide and alcohols are chlorinated. Currently, however, method (b) is employed exclusively. This method (b) is schematically described by the following reaction formulae;

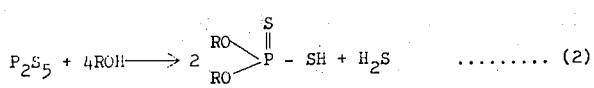
......... (2)

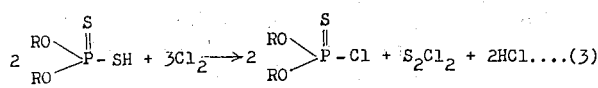
....(3)

wherein R represents an alkyl group.

This reaction provides a crude reaction product in good yield. However, problems in the removal of sulfur monochloride, and the like, are involved in this method. Although number of methods as to the removal of sulfur monochloride have so far been suggested, none of them are satisfactory due to various defects.

a. Attempting to separate the end product from the crude reaction product by distillation results in a serious reduction in both yield and purity of the product due to the reaction between the sulfur monochloride and the acid chloride upon heating.

b. Where sulfur monochloride is decomposed with water, a colloidal precipitate of sulfur is formed, which makes the separation thereof from the product difficult and causes a reduction in yield.

c. Treating with a sulfite or the like requires stoichiometrically a large quantity of sulfite and, since a large quantity of aqueous solution must be dealt with, a large-capacity reaction vessel is necessary. In addition, an acid sulfite, a polythionate, etc., produced as by-products, must be treated, which imposes an additional problem.

d. In reacting sulfur monochloride with hydrogen sulfide, materials of the apparatus are seriously corroded due to the copresence of hydrogen chloride, produced as a by-product, and hydrogen sulfide, and, in addition, the sulfur is produced as fine particles or becomes rubber-like, which makes the separation thereof from the end product quite difficult, leading to a reduction in yield and to a difficulty in operation.

Thus, in the reaction between chlorine and the reaction product obtained from phosphorus pentasulfide and alcohols, the separation of sulfur monochloride produced as a by-product has been a most difficult problem, although various treating methods are known as described above.

SUMMARY OF THE INVENTION

As a result of various investigations to remove the abovedescribed defects, the inventors have discovered that, when sulfur monochloride produced as the by-product in the synthesis of the acid chloride is reacted with a metal sulfide solution under definitely controlled conditions, the sulfur monochloride is decomposed with the sulfur formed being quite crystalline in nature, which facilitates the separation of sulfur from the end product.

That is, the present invention is a process for producing dialkylphosphorochloridothioate which comprises chlorinating a dialkyldithiophosphoric acid and continuously reacting at a pH of 6 to 9 the reaction product obtained with a metal sulfide.

DETAILED DESCRIPTION OF THE INVENTION

First, the dialkyl dithiophosphoric acid is obtained by reacting phosphorus pentasulfide with an alcohol. It is commonly known that the thus obtained dialkyl dithiophosphoric acids include not only the compound represented by the foregoing general formula (1) but, depending upon the reaction conditions, a small amount of monoalkyl dithiophosphoric acid, a neutral trialkyl dithiophosphoric ester and a phosphoric ester having the following general formula

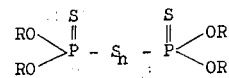

wherein R represents a $C_1$ to $C_3$ alkyl group and n is a positive integer, generally 2. The crude dialkyl dithiophosphoric acids thus obtained can be utilized in the following chlorinating process without performing any special purification. Therefore, it will be understood that the aforesaid general formula (I) (1) stands for representative illustrations.

The thus obtained dialkyl dithiophosphoric acid is then chlorinated with chlorine gas to produce the end product, dialkyl phosphorochloridothioate, sulfur monochloride and hydrogen chloride. The hydrogen chloride gas produced is removed from the reaction system and collected.

Suitable reaction solvents are aromatic hydrocarbons which are inert in this reaction. The fundamental reaction for producing dialkyl phosphorochloridothioate is known and, in the process of the present invention too, the steps used in the production of crude dialkyl phosphorochloridothioate are not particularly different from the conventional processes.

Then, as the metal sulfide solution which are reacted with the reaction product, this solution being a characteristic aspect of the present invention, a solution of a sulfide such as an alkali metal sulfide (e.g., sodium sulfide, potassium sulfide, etc.) and a solution of a soluble alkaline earth metal sulfide (e.g., calcium sulfide, barium sulfide, etc.), including a solution of the hydrosulfides or polysulfides thereof can be used. The reaction of sulfur monochloride with $Na_2S$ as representative of these metal sulfide is described below.

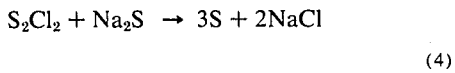

(4)

These sulfides can be used alone or in combination. It is necessary that the concentration of the metal sulfide used be not less than about 0.8 mol/liter, although the concentration can vary somewhat depending upon the history of reaction conditions, processing conditions and the like. In many cases, a concentration of about 1 mol/liter is particularly preferable.

If the metal sulfide concentration is less than about 0.8 mol/liter, crystallinity of the sulfur precipitate will be adversely affected and colloidal sulfur will be formed as in the case of the decomposing of sulfur monochloride with water alone, which makes the separation of precipitated sulfur from the end product difficult, providing unfavorable results.

Furthermore, in many cases, it is also of importance that the M/S molar ratio (M representing the alkali metal or the alkaline earth metal) in the sulfide be less than about 4, preferably 2.

Use of alkali component-rich sulfides having an M/S ratio of above about 4 reduces the amount of crystalline sulfur precipitate as described above and, moreover, a gradual separation or formation of colloidal sulfur results, thus affecting the separation of the product. Therefore, such metal sulfides are not preferred.

As set forth previously, the above-described sulfides include various polysulfides as well as hydrosulfides.

This metal sulfide solution can be readily obtained, for example, by absorbing hydrogen sulfide, produced as a by-product in the production of the dialkyl dithiophosphoric acid as indicated by reaction (2), with a desired alkali solution. When sodium hydroxide is used as representative of the alkali solution, the reaction proceeds as follows;

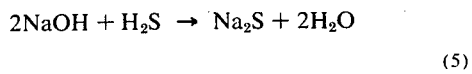

(5)

Therefore, treatment of the hydrogen sulfide and both recovery and use thereof can be effectively conducted at the same time. Thus, the preparation of the sulfide solution as described above from the hydrogen sulfide produced in the reaction can result in an efficient operation due to the recycling nature thereof.

Accordingly, such circulating process is recommendable as one advantageous aspect of the present invention. However, a separately prepared fresh sulfide solution can of course be supplied also as well as the above described sulfide solution prepared by absorption of hydrogen sulfide.

Generally speaking, sodium sulfide is industrially the most advantageous as the starting material for preparing the sulfide solution.

In the reaction between the metal sulfide solution and the acid chloride reaction product containing the sulfur monochloride, it is necessary to add both solutions dropwise at the same time to bring with each other into contact while maintaining the pH of the reaction system always at between 6 to 9. In this reaction, satisfactory results cannot be obtained if either of the metal sulfide or the chlorination reaction product exists in an excess amount. That is, if the metal sulfide solution is added to the reaction product solution, the pH shifts from the acidic side to the alkaline side during the addition, whereas if the reaction product solution is added to the metal sulfide solution, the pH shifts from the strongly alkaline side to the acidic side. Therefore, even if the pH were adjusted to 6 to 9 at the end, the resulting sulfur would become colloidal or massive due to the adhesiveness in either case and little, if any, crystalline sulfur would be produced. Therefore, the separation of the sulfur from the end product is extremely difficult, resulting in a reduction in both workability and yield of the end product.

Accordingly, it is necessary to bring both solutions into contact with each other while controlling the pH substantially within the above-specified range, though a little operative variations are permissible during the step. In many cases, a pH ranging from 7 to 8 is the most preferred although this depends upon various operative conditions.

In the above-described reaction processing, it is preferable to place in advance a solvent in the reaction system in a desired amount so as to effect sufficient stirring.

As such solvents a fresh solvent for use in the reaction can be employed. In addition, part of the organic layer to be separated in the subsequent filtration step or recovered solvent can also be used.

As a result of the above-described reaction, a metal chloride is also produced due to the decomposition of the sulfur monochloride. If necessary, this metal chloride can be partly recycled and added in advance to the reaction system or to the metal sulfide solution in the aforesaid contact reaction so as to attain a salting-out effect which serves to precipitate the sulfur.

The temperature during the processing can be less than about 50°C, but the most preferred results can be obtained at ordinary temperatures.

The sulfur thus processed in accordance with the process of the present invention has lustre, is well-developed crystals and contains an extremely small amount of the end product acid chloride. In addition, it is easily filterable and is quite useful. That is, the thus recovered crystalline sulfur is so pure that it may be used in the production of the phosphorus pentasulfide, which is a starting material, or else, it may be dissolved in an alkali or sulfide solution for preparation of the metal sulfide solution and from the standpoint of economics it is a preferable starting material for the metal sulfides.

On the other hand, the acid chloride contained in the separated organic layer is separated and purified in a usual manner to obtain the end product with high purity in high yield. It can be seen from the above description, that the process in accordance with the present invention is extremely valuable from the industrial viewpoint.

The present invention will now be illustrated in more detail by the following non-limiting examples of preferred embodiments of the present invention. Unless otherwise indicated, all parts and percents are by weight.

EXAMPLE 1

Production of diethyl phosphorochloridothioate:

50 Grams of toluene was placed in a 300 ml four neck flask equipped with a stirrer, a thermometer, a condenser, and a dropping funnel, and 111 g of phosphorus pentasulfide was suspended therein. Thereafter, 92 g of ethanol was added dropwise thereto at a temperature of 70°C over about 30 minutes. After the dropwise addition, the temperature of the system was raised to 80°C and the system was heated and ripened at the same temperature for 1 hour to complete the reaction. Thus, diethyl dithiophosphoric acid was synthesized. Hydrogen sulfide produced by the reaction was passed from the top of the condenser and absorbed into 500 g of a 10% sodium hydroxide solution.

Then, diethyl dithiophosphoric acid, free of unreacted phosphorus pentasulfide, was transferred into a 300 ml four neck round bottom flask equipped with a stirrer, a thermometer, a condenser and a chlorine-introducing inlet, and 90 g of chlorine gas was bubbled thereinto at a temperature of 30°C. After the completion of chlorination, the hydrogen chloride produced was removed under reduced pressure.

Subsequently, 100 g of toluene was placed in a 1 liter four neck round bottom flask equipped with a stirrer, a thermometer and two dropping funnels (one for a sodium sulfide solution and the other for the chlorination reaction product). Then, the sodium sulfide solution (prepared by absorbing the hydrogen sulfide, produced upon synthesis of diethyl dithiophosphoric acid, in a sodium hydroxide solution; concentration of sodium sulfide solution: not less than 0.8 mol/liter; Na/S molar ratio: not more than 4) and the chlorination reaction product were added dropwise to the flask at the same time to decompose the sulfur monochloride while maintaining the pH of the reaction solution weakly alkaline and approximating a pH of 7 at the end of the reaction. The sulfur thus precipitated was filtered out and, after recovering the toluene from the organic layer, diethyl phosphorochloridothioate was obtained by vacuum distillation in a yield of 80% based on the phosphorus pentasulfide used. The thus precipitated sulfur was crystalline and could be extremely easily filtered.

EXAMPLE 2

Production of dimethyl phosphorochloridothioate:

62 grams of methanol was added dropwise to 111 g of phosphorus pentasulfide at a temperature of 60°C using the same apparatus as in the synthesis of diethyl dithiophosphoric acid. After the dropwise addition, the solution temperature was increased to 70°C to synthesize dimethyl dithiophosphoric acid. On the other hand, the hydrogen sulfide gas produced in this occasion was absorbed by a 15% sodium hydroxide solution. Then, 89 g of chlorine gas was bubbled into the thus obtained dimethyl dithiophosphoric acid using the same chlorination reaction apparatus as used in Example 1, thus effecting chlorination.

The concentration and the Na/S ratio of the sodium sulfide solution obtained in the foregoing step were adjusted to 1.2 mol/liter and 1.8, respectively. To this was added a small quantity of the sodium chloride solution produced as a by-product in Example 1. The thus prepared sodium sulfide solution and the chlorination reaction product were simultaneously added dropwise using the same apparatus as used in Example 1 in which recovered solvent was placed in advance to thereby decompose the sulfur monochloride at a temperature of about 30°C. In the course of the reaction, both solutions were added dropwise while controlling the pH to 7 - 8. After the reaction, the dropwise addition was completed while maintaining the pH at about 7. Stirring was continued for a while after the completion of the reaction to finish the decomposition reaction. Then, the reaction solution was filtered to separate it into an aqueous layer and an organic layer. After work-up in the same manner as described in Example 1, highly pure dimethyl phosphorochloridothioate was obtained from the organic layer in a yield of 77% based on the phosphorus pentasulfide. Filtration of the sulfur was extremely easy, and the thus obtained sulfur was lustrous crystals.

EXAMPLE 3

Production of diisopropyl phosphorochloridothioate:

120 Grams of isopropanol was reacted with 111 g of phosphorus pentasulfide at 80°–90°C using the same apparatus as used in Example 1, thus synthesizing diisopropyl dithiophosphoric acid. Hydrogen sulfide gas produced as a by-product was absorbed by a 20% sodium hydroxide solution. Subsequently, 91 g of chlorine gas was bubbled into the reaction solution in the same manner as described in Example 1, to conduct chlorination. Thereafter, a sodium polysulfide solution (1.2 mol/liter) was prepared by dissolving the recovered sulfur in the sodium sulfide solution obtained in the foregoing step. This sodium polysulfide solution and the chlorination reaction product were treated in the same manner using the same apparatus as described in Example 2, thus decomposing the sulfur monochloride. The thus formed sulfur was filtered out. Then, in the same manner as described in Example 2, highly pure diisopropyl phosphorochloridothioate was obtained in a yield of 85% based on phosphorus pentasulfide.

The filtration was extremely easy. Thus, lustrous sulfur crystals were formed with the formation of almost no flocculent sulfur.

EXAMPLE 4

Production of dimethyl phosphorochloridothioate:

Dimethyl dithiophosphoric acid was obtained according to the same procedures and using the same apparatus as described in Example 2. On the other hand, the hydrogen sulfide gas produced was absorbed by a 10% barium hydroxide solution.

Subsequently, dimethyl phosphorochloridothioate was obtained by conducting chlorination in the same manner as described in Example 2. After adjusting the concentration of the barium sulfide solution obtained in the foregoing step to 0.85 mol/liter with barium hydrosulfide, this solution and the aforesaid chlorination reaction product were added dropwise at the same time.

This reaction was conducted by simultaneously adding dropwise both solutions to the same apparatus as used in Example 1 into which toluene and a small quantity of barium chloride solution had been placed in advance. During the reaction, the pH of the solution was controlled to 7 - 8 at an ordinary temperature. After work-up in a similar manner, highly pure dimethyl phosphorochloridothioate was obtained in a yield of 79% based on the dimethyl dithiophosphoric acid. The precipitated sulfur was so crystalline that the filtration operation could be conducted quite easily.

While the invention has been described in detail and with reference to specific embodiments thereof, it will be apparent to one skilled in the art that various changes and modifications can be made therein without departing from the spirit and scope thereof.

What is claimed is:

1. A process for producing dialkyl phosphorochloridothioate, which comprises chlorinating a dialkyl dithiophosphoric acid, and continuously mixing at a pH of 6 to 9 the reaction product obtained with a metal sulfide solution wherein said metal sulfide is an alkali metal sulfide, a water-soluble alkaline earth metal sulfide, the hydrosulfides thereof or the polysulfides thereof.

2. The process of claim 1, wherein the concentration of said metal sulfide is not less than about 0.8 mol/liter.

3. The process of claim 1, wherein the molar ratio of the metal to the sulfide in said metal sulfide is less than about 4.

4. The process of claim 1, wherein said pH is from 7 to 8.

5. The process of claim 1, wherein the metal sulfide is sodium sulfide.

6. The process of claim 1, wherein the concentration of said metal sulfide is about 1 mol/liter.

* * * * *